United States Patent Office 2,940,945
Patented June 14, 1960

---

2,940,945
RESINOUS COMPOSITIONS COMPRISING AN ALDEHYDE-MODIFIED AMIDE INTERPOLYMER AND AN ALKYD RESIN

Roger M. Christenson, Richland Township, and Harold G. Bittle, Gibsonia, Pa., assignors to Pittsburgh Plate Glass Company, a corporation of Pennsylvania No Drawing. Filed Feb. 13, 1957, Ser. No. 639,844

13 Claims. (Cl. 260—21)

This invention relates to resinous compositions particularly useful in coating compositions, and pertains more specifically to resinous compositions containing a blend of an aldehyde modified acrylamide interpolymer and an alkyd resin.

In a copending application, Serial No. 490,409, filed February 24, 1955, now abandoned, it is disclosed that useful resinous materials are readily obtained by reacting an aldehyde, particularly formaldehyde, with an interpolymer of acrylamide and one or more polymerizable ethylenically unsaturated monomers. The resulting resins range from soft flexible materials to very hard solids, depending upon the choice of monomers utilized in preparing the acrylamide interpolymer which in turn is reacted with the aldehyde. The resins are useful in coating compositions, giving very tough and mar resistant films which possess excellent chemical resistance.

However, it has been found that films of the aldehyde modified amide interpolymers, while possessing many outstanding properties, tend to be too brittle for some applications. Moreover, the recoat adhesion of some such interpolymers tends to be poor.

It has now been discovered, however, that the flexibility of aldehyde modified amide interpolymers can be substantially improved by blending such interpolymers with an alkyd resin, preferably short oil length alkyds prepared using a considerable excess of hydroxyl groups. The resulting compositions form films with excellent flexibility, and the recoat adhesion is also very good. It has also been noted that the carboxyl groups in the alkyd resin tend to provide an internal type catalysis, so that the coating compositions of this invention cure at lower temperatures than do the aldehyde modified amide interpolymer films. Moreover, these improved properties of the amide interpolymer-alkyd resin blends are obtained without appreciable loss of any of the desirable properties possessed by the aldehyde modified amide interpolymers. Consequently, films of coating compositions containing blends of alkyd resins with aldehyde modified amide interpolymers are characterized by excellent gloss, mar resistance, color retention, moisture resistance, stain resistance, grease resistance, heat resistance, detergent resistance, corrosion resistance, recoat adhesion, flexibility, and lack of odor. In addition, these coating compositions can be prepared with a higher solids content than can compositions containing only the modified amide interpolymer.

These properties render the compositions of this invention particularly useful as coatings for sheet metal products such as household appliances, automobiles, as metal priming compositions, as can coatings, and for many other purposes.

As stated hereinabove, acrylamide or other polymerizable amide is polymerized with one or more ethylenically unsaturated monomeric compounds, and the resulting interpolymer reacted with an aldehyde to form one component of the coating compositions of this invention. The exact mechanism whereby the amide interpolymers are obtained is not definitely known, but is believed to begin by the formation initially of a relatively short chain soluble interpolymer having an approximate structure as follows, acrylamide being utilized for illustrative purposes:

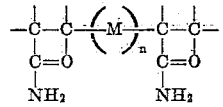

wherein M represents a unit of a monomer polymerizable with acrylamide, and $n$ represents a whole number greater than 1. For example, if styrene were utilized as the second monomer, M would represent the unit

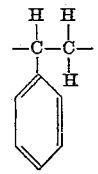

The short chain interpolymer then reacts with an aldehyde as represented by formaldehyde, to give the structure:

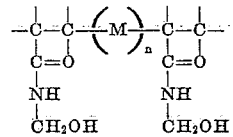

wherein M and $n$ have the significance set forth hereinabove.

In the event the formaldehyde is utilized in the form of a solution in butanol or other alkanol, etherification may take place so that at least some of the methylol groups in the above structure will be converted to groups of the structure

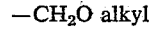

$$-CH_2O \text{ alkyl}$$

the alkyl groups being derived from the alkanol utilized. The amount of etherification taking place depends in large measure upon the pH of the reaction medium, with acid conditions favoring etherification. The etherification of the acrylamide interpolymer appears to be analogous to the conventional butylation of urea and melamine resins.

Among the monomers which may be polymerized with acrylamide are included methyl acrylate, ethyl acrylate, butyl acrylate, isobutyl acrylate, hexyl acrylate, octyl acrylate, and the corresponding methacrylates, styrene, vinyl toluene, maleate esters such as dibutyl maleate, acidic materials such as acrylic acid, methacrylic acid, maleic anhydride, vinyl ethers, vinyl ketones, vinyl pyridines, vinyl sulfonamides, allyl acetoacetates, glycidyl acrylates, methacrylamide, dimethylbenzyl methacrylate, durenediol dimethacrylate, and the like. In general, it is preferred that the monomer utilized contain a single $CH_2=C<$ group in terminal position, and an especially preferred group of monomers includes ethyl acrylate, butyl acrylate, methyl acrylate, styrene, vinyl toluene, acrylic acid, and monomethyl styrene.

It has been found that preferred acrylamide interpolymers are obtained when at least two monomeric compounds are interpolymerized with the acrylamide. In this manner it is possible to tailor the interpolymer to have any desired degree of hardness or flexibility. For example, one useful ternary interpolymer is prepared from acrylamide, ethyl acrylate and styrene. Also, a small amount of methyl methacrylate tends to improve the hardness of two component interpolymers where one of the monomers is of the type which forms soft homopolymers. A small quantity of an acid monomer such as acrylic acid, methacrylic acid, crotonic acid, maleic acid, or fumaric acid has been found to be particularly useful as an internal catalyst in that it imparts to the coating composition desirable fast curing properties. In place of acrylamide, any other polymerizable amide, for example, methacrylamide or itaconate diamide, may be utilized.

Interpolymers of acrylamide with one or more polymerizable monomers are most readily prepared by carrying out the polymerization in a solvent in which the acrylamide, a white, crystalline solid at room temperature, and the other monomer(s) are soluble, and at reflux temperatures. Butanol has proven to be a satisfactory solvent in most cases. Isopropyl alcohol, isobutyl alcohol, butyl Cellosolve, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

In carrying out the polymerization reaction a peroxygen type catalyst is ordinarily utilized. Useful catalysts for this purpose include benzoyl peroxide, acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazo-thio-(2-naphthyl) ether, may also be used as polymerization catalysts in the preparation of acrylamide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to give 100 percent conversion, is preferably employed. For low viscosity interpolymers the bulk of the catalyst is added initially and later additions used only to secure desired conversions. Larger amounts of catalyst added initially give lower viscosities.

Since it is desirable in many instances that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

Very useful acrylamide interpolymers can also be obtained when no chain modifying agent is employed. In such instances high molecular weight interpolymers are produced, this factor adding to the toughness and enhancing the fabrication properties of the films, as well as reducing the taste properties of the interpolymer.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions are important in carrying out the polymerization because of the very rapid reaction rate and because the reaction is highly exothermic. Some control of the heat of reaction is obtained by adding the acrylamide to the polymerization mixture incrementally. Good agitation is also desirable.

Another method for preparing acrylamide interpolymers involves utilization of "block" or "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the acrylamide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

Useful resinous materials containing acrylamide are obtained by reacting the interpolymers prepared according to the method described above with an aldehyde. Formaldehyde, in solution in water (formalin) or in a lower alcohol such as butanol, or a formaldehyde yielding substance such as para-formaldehyde, trioxymethylene, or hexamethylenetetraamine, is greatly preferred. However, other monoaldehydes including acetaldehyde, butyraldehyde, furfural, and the like, preferably containing only atoms of carbon, hydrogen, and oxygen, can be used. Dialdehydes such as glyoxal are not preferably employed as they frequently cause gelation of the acrylamide interpolymer to occur.

It is preferred that the aldehyde be reacted with an interpolymer containing from about 5 percent to about 45 percent by weight of acrylamide, the balance being the other ethylenically unsaturated monomer(s). It has been found that those interpolymers containing the higher levels of acrylamide with those monomers which ordinarily form hard homopolymers, give hard and flexible films; whereas interpolymers containing lower levels of acrylamide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymer. For example, in some ternary interpolymer systems it may be desirable to utilize about 20 percent by weight of acrylamide, and 40 percent each of two additional monomers such as styrene and butadiene, or in some instances, such as when acrylic acid or some other ethylenically unsaturated acid is utilized as an internal catalyst, it is desirable that the interpolymer contain about 20 percent acrylamide, a total of about 72 percent to 79 percent of two additional ethylenically unsaturated monomers and about 1.0 percent to about 8.0 percent of the unsaturated acid. The amount of the monomers necessary in any interpolymerization reaction can readily be determined by simple experiment.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride. Other acid catalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylenetetraamine, and other basic amines may also be utilized, and, in fact, there is evidence to indicate that the use of the basic catalysts tends to give faster curing resin films.

If desired, the catalyst may be dispensed with entirely, although it is difficult to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. If the aldehyde is used in the form of an alcoholic solution, it is preferred to utilize from about 0.2 percent to 1.0 percent by weight of catalyst, based upon the weight of the acrylamide interpolymer which is reacted with the aldehyde.

The reaction of the acrylamide interpolymer with the aldehyde can be carried out simply by adding the aldehyde and catalyst (if one is utilized) to the polymerization mixture obtained by polymerizing acrylamide and one or more ethylenically unsaturated monomer and refluxing the resulting mixture for a period of from about 3 to 5 hours until a desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials may also be obtained by first reacting the acrylamide with an aldehyde such as formaldehyde to obtain an alkylol acrylamide, for example, methylol acrylamide, and then polymerizing the methylol acrylamide with one or more of the ethylenically unsaturated monomeric materials disclosed hereinabove. The polymerization utilizing methylol acrylamide is carried out in substantially the same manner as when acrylamide is interpolymerized with one or more monomers.

Regardless of the method by which the resinous material is obtained, the products which are blended with alkyd resins in accordance with this invention will contain in the polymer chain a series of at least two, and normally many, attached groups of the structure:

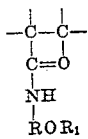

wherein R is a lower aliphatic hydrocarbon radical, that is, the radical derived by removing oxygen from a lower aliphatic aldehyde; for example, if formaldehyde is utilized the radical R represents a methylene group ($-CH_2-$). The molecular weight of the interpolymer will, of course, depend on the number of groups of the above structure in the polymer chain. When an alcoholic solution of the aldehyde, for example, a butanol solution of formaldehyde is employed, etherification may take place and at least a portion of the alcohol is reacted into the polymer chain so that at least some of the radicals $R_1$ will represent a lower alkyl radical such as butyl, or in other words, a mixture of hydrogen and butyl radicals. When the aldehyde is utilized alone, that is, not in an alcohol solution, the radical $R_1$, of course, will represent hydrogen. The free valences may be satisfied with either hydrogen or hydrocarbon, depending on the amide which is utilized.

The resin which is blended with the aldehyde modified amide resins in accordance with the present invention may be any of the alkyd resins utilized in the coatings field and which are readily available from many commercial sources. Generally, however, the oil modified resins are employed. The oil utilized is preferably selected from the group consisting of linseed oil, coconut oil, cottonseed oil, tall oil, and castor oil; however, other drying or semi-drying oils such as fish oils, soybean oil, and the like can also be employed. It is also possible to replace a portion of the phthalic acid or anhydride in the alkyd with minor quantities of equivalent polyfunctional acids such as maleic acid or anhydride, fumaric acid, isophthalic acid, and the like, and in a similar manner a portion of the glycerin may be replaced with minor quantities of other polyfunctional alcohols such as pentaerythritol, trimethylol propane, ethylene glycol, or the like. Such other polyfunctional acids or alcohols should not, of course, be utilized in amounts which cause the alkyd resin to gel during preparation. Polyesters containing adipic acid and various glycols and/or polyols are also of utility in blends with the acrylamide interpolymers.

Normally, the alkyd is prepared by heating phthalic acid or anhydride and glycerin together with an oil derivative modified by ester interchange with glycerin in order to form monoglycerides or diglycerides of fatty acids. In some instances "oil modification" is effected by first reacting a free fatty acid of a drying glyceride oil with glycerin to form mono- or diglycerides or mixtures thereof. These partial esters may then be admixed with phthalic acid or anhydride and glycerin and the mixture heated to form the alkyd resin. It is also possible to obtain the oil modified resin by incorporation of the fatty acids and glycerin with the phthalic acid or anhydride and heating the mixture to reaction temperature. Preferably, the resin components are heated until water is evolved by condensation reaction and is separated from the reaction zone. The reaction is continued until fairly high viscosity is obtained; for example, approximately W to Z or above when the resin is diluted by about 50 percent by weight xylol or other aromatic solvent.

Many of the oil modified alkyd resins are very compatible with aldehyde modified acrylamide interpolymers of the type described hereinabove, and the two components can be combined in nearly all proportions to give compatible mixtures. Among the preferred alkyd resins which tend to be compatible with the aldehyde modified acrylamide interpolymers over a wide range of proportions are the coconut oil alkyds, which are particularly useful, probably because of their relatively short chain length, cottonseed oil alkyds, and castor oil alkyds. It has been found that those alkyd resins having a short oil length and a relatively high hydroxyl number or a high carboxyl number are more compatible than are alkyd resins having a low hydroxyl or low carboxyl value. The alkyd is ordinarily prepared utilizing an excess of hydroxyls of 35 percent or less, and preferably with an excess of about 5 percent to 25 percent.

It is to be understood, however, that the invention is not limited to completely compatible blends of alkyd resins with aldehyde modified acrylamide interpolymers, for very useful compositions can also be obtained by admixing aldehyde modified amide interpolymers with alkyd resins which are only partially compatible or even incompatible therewith. Such compositions can be used to form films which appear to be completely homogeneous and in which the incompatibility, if any, is not apparent, either in appearance or in properties.

Thus, the proportions in which the aldehyde modified amide interpolymer and the alkyd resin are admixed are not critical; however, the most useful compositions are obtained when the components are blended in amounts such that there is present about 25 percent to 95 percent of the amide resin and about 5 percent to 75 percent of the alkyd resin.

No special expedients are necessary in formulating the resinous blends of alkyd resins and aldehyde modified amide resins into coating compositions. For example, they may be prepared simply by incorporating the resinous components in a suitable solvent system by simple agitation, or each resinous component may be dissolved in a solvent and the resulting solutions combined to form the finished coating composition.

Preferably, however, the alkyd resin and the amide resin are admixed and refluxed for a period of approximately an hour before being formulated into a coating composition. It has been found that the refluxing provides a product which is a better resin for dispersion of pigments and gives better dispersion stability than the product obtained when the resinous components are cold blended in a suitable solvent system, although as indicated above, this latter method may also be employed with good results.

The solvents utilized are likewise not critical and any solvent or solvents which will dissolve the particular amide interpolymer and the alkyd resin utilized may be employed. Since the amide interpolymer is ordinarily prepared in a butanol solution, butanol is conveniently used as one of the solvents, although as pointed out hereinabove it is desirable to replace about half of the butanol with another solvent such as xylol. The alkyd resin is preferably utilized in the form of a 50 percent solution in xylol or other solvent.

Some combinations of alkyd resins with aldehyde modified acrylamide interpolymers, even though giving a clear film and showing compatibility, may go through a stage of hazing or cloudiness during the solvent evaporation. This may be described as a type of solvent incompatibility and in working with pigmented compositions a system of this type is likely to show some pigment flocculation and floatation. A "keying" solvent is of considerable aid in preventing flocculation and floatation in these blends, useful "keying" solvents including the high boiling acetates or ketones such as hydroxyethyl acetate or methyl isobutyl ketone.

White pigments such as titanium dioxide or zinc oxide, or black pigments such as carbon black or lamp black, and the like, may be added to the coating composition, as may colored pigments to form any desired colors. Pigmentation of the amide resin-aldehyde systems of this invention is best accomplished by grinding in the amide resin or in some cases in the mixed vehicle, but the pigment should preferably not be ground in the alkyd resin alone. The grinding is preferably carried out in a Baker-Perkins type mill or in a pebble mill. For improved gloss stability of pebble milled compositions, finely divided pigment dispersing aids such as calcium carbonate, sold under the trade name Multiflex MM, and the like, may be used.

The following examples illustrate in detail the preparation of blends of amide modified interpolymers with alkyd resins. The examples are not intended to limit the invention, however, for there are, of course, numerous possible variations and modifications.

*Examples I to VI*

These examples illustrate the preparation of aldehyde modified acrylamide interpolymers which can be blended with alkyd resins to form the coating compositions of this invention. The polymerization in each example was carried out by mixing the polymerizable components with a chain transfer agent (except in Example VI where none was utilized) in a solvent such as butanol or xylene, and adding a polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Di-t-butyl peroxide
C—Cumene hydroperoxide
D—Alpha-methyl styrene dimers
E—Dodecyl mercaptan
F—Tertiary dodecyl mercaptan

|  | Example I | Example II | Example III | Example IV | Example V | Example VI |
|---|---|---|---|---|---|---|
|  | 15% Acrylamide: 25% Methyl Methacrylate; 60% Ethyl Acrylate | 20% Acrylamide: 20% Methyl Methacrylate; 60% Ethyl Acrylate | 15% Acrylamide: 25% Styrene; 60% Ethyl Acrylate | 20% Acrylamide: 40% Styrene; 40% Butadiene | 20% Acrylamide: 40% Styrene; 40% Butadiene | 20% Acrylamide: 80% Vinyl Toluene |
| Polymerization Charge and Procedure: |  |  |  |  |  |  |
| Acrylamide _____ Parts __ | 3 | 40 | 3 | 160 | 160 | 250 |
| Monomer A _____ do __ | 5 | 40 | 5 | 320 | 320 | 1000 |
| Monomer B _____ do __ | 12 | 120 | 12 | 320 | 320 |  |
| Catalyst _____ do __ | 90.8 C | 2 A | 90.8 C / 90.8 A | 16.0 B | 16.0 B | 25.0 A |
| Modifier _____ do __ | 90.8 F | 2 D | 90.8 F | 8.0 E | 8.0 E |  |
| Solvent— |  |  |  |  |  |  |
| (Butanol) _____ do __ | 20.0 | 200 | 20.0 | 1200 | 1200 | 1250 |
| (Xylene) _____ do __ |  |  |  | 500 | 500 |  |
| Reflux Time (hours) | 4 | 1 | 6 | 16 (bomb) | 16 (bomb) | 10 |
| Polymer Properties: |  |  |  |  |  |  |
| Percent Solids | 52.5 | 51.6 | 51.5 | 25.1 | 25.1 | 49.1 |
| Viscosity (Gardner) | Z3 | Z5–Z6 | Z |  |  |  |
| Formaldehyde Condensate: |  |  |  |  |  |  |
| Butanol Solution of Formaldehyde Parts __ | 6.34 | 84.6 | 6.34 | 339 | 339 | 75/351 parts resin |
| Maleic Anhydride _____ do __ | 36.3 | 1.0 | 36.3 | 4.5 | 4.5 | 1.0 |
| Reflux Time (hours) | 3 | 3½ | 3 | 4 | 4 | 16 |
| Final Product: |  |  |  |  |  |  |
| Percent Solids | 50.1 | 48.95 | 50.6 | 49.4 | 49.4 | 41.3 |
| Viscosity (Gardner) | Y | Y | U–V | Z | Z | X–Y |
| Color (Gardner) | 3–4 | <1 | 3–4 | 3–4 | 3–4 | 1–2 |

Example VII

An interpolymer was prepared from a mixture of the following materials:

| | Parts by weight |
|---|---|
| Styrene | 40 |
| Ethyl acrylate | 45 |
| Acrylamide | 15 |
| Cumene hydroperoxide | 1 |
| Tertiary dodecyl mercaptan | 1 |

The above components were refluxed in butanol for about 6 hours. The resulting product was then admixed with 12.6 parts of formaldehyde in the form of a 40 percent solution in butanol and the mixture refluxed for an additional 3 hours. One half of the butanol was then removed by distillation and replaced by an equal volume of xylene. The resulting resinous product had the following properties:

| | |
|---|---|
| Solids (percent) | 48–52. |
| Weight per gallon (pounds) | 8.0±0.1. |
| Viscosity (Gardner-Holdt) | U to W. |
| Color (Gardner 1933) | 5 (maximum). |
| Mineral spirits tolerance (cc. of naphtha per 100 grams resin) | 75 (minimum). |

Example VIII

Eighty-five parts of vinyl toluene, 15 parts of acrylamide, 1 part of cumene hydroperoxide and 1 part of tertiary dodecyl mercaptan were refluxed for 2 hours and 0.5 part of additional cumene hydroperoxide was added. Refluxing was continued for a further period of 2 hours. The product was then admixed with a solution comprising 12.6 parts of formaldehyde (40 percent solution in butanol), and ⅓ part of maleic anhydride was added. The resulting mixture was then refluxed for 3 hours after which the butyl alcohol was distilled to provide a product having the following properties:

| | |
|---|---|
| Solids (percent) | 48–52. |
| Weight per gallon (pounds) | 7.9. |
| Viscosity (Gardner-Holdt) | X to Z. |
| Color (Gardner) | 8 (maximum). |
| Mineral spirits tolerance | 400 (minimum). |

Example IX

This example illustrates the use of an unsaturated acid in the acrylamide interpolymerization to provide an internal catalyst which accelerates the cure of the coating composition. The interpolymer was prepared from the following components in the amounts set forth:

| | Parts by weight |
|---|---|
| Styrene | 39 |
| Ethyl acrylate | 44 |
| Acrylamide | 15 |
| Acrylic acid | 2 |
| Cumene hydroperoxide | 1 |
| Tertiary dodecyl mercaptan | 1 |

The above components were admixed and refluxed for 2 hours after which an additional 0.5 part of cumene hydroperoxide was added and reflux was continued for a further period of 2 hours. A solution comprising 12.6 parts of formaldehyde (40 percent concentration in butanol) was added together with about 0.33 part of maleic anhydride catalyst. The resulting mixture was refluxed for 3 hours, after which one half of the butyl alcohol was removed by distillation and replaced by an equal amount of xylene. The resin had a solids content of 48 percent, a Gardner color of 7 and a Gardner-Holdt viscosity of S to X.

Example X

A series of 5 different alkyd resins was prepared. The quantities of reactants charged to prepare each resin are set forth hereinbelow. The proportions used yielded 100 parts of resin after the water of esterification was removed.

| Component | Alkyd A, parts | Alkyd B, parts | Alkyd C, parts | Alkyd D, parts | Alkyd E, parts |
|---|---|---|---|---|---|
| Cottonseed oil acids | 42.8 | 42.4 | 38.8 | | |
| Coconut oil acids | | | | 36.0 | 11.9 |
| Phthalic anhydride | 40.0 | 39.7 | 42.0 | 43.3 | 27.8 |
| Glycerol | 25.3 | 23.0 | 27.5 | 27.5 | 11.5 |
| Pentaerythritol | | 2.4 | | | |
| Tertiary butyl benzoic acid | | | | 2.7 | |
| Adipic acid | | | | | 9.7 |
| Sebacic acid | | | | | 13.9 |
| Dipropylene glycol | | | | | 33.5 |

Each of the alkyd resins was reduced to a total solids content of 50 percent in xylol and blended with a styrene, ethyl acrylate, acrylamide interpolymer composed of 39 parts by weight of styrene, 44 parts by weight of ethyl acrylate, 15 parts by weight of acrylamide, and 2 parts by weight of acrylic acid, in amounts ranging from (1) 9 parts of the acrylamide interpolymer to 1 part of the alkyd resin, (2) 3 parts of the acrylamide interpolymer to 1 part of the alkyd resin, (3) 1 part of the acrylamide interpolymer to 1 part of the alkyd resin, (4) 1 part of the acrylamide interpolymer to 3 parts of the alkyd resin, and (5) 1 part of the acrylamide interpolymer to 9 parts of the alkyd resin. The alkyd resin and the acrylamide interpolymer were compatible in every instance except when Alkyd B and the acrylamide interpolymer were admixed in an amount of 3 parts by weight of the acrylamide interpolymer to 1 part by weight of the alkyd resin, in which instance they were incompatible. Films of each composition were prepared and baked for about 30 minutes at 350° F. In each instance a hard, clear film was obtained.

Example XI

An alkyd resin was prepared by cooking together 51.1 parts by weight of castor oil, 35.5 parts by weight of phthalic anhydride, and 18 parts by weight of glycerol. The resin was cooked to an acid number of 9–10, and reduced to 50 percent solids in xylol.

The alkyd resin thus prepared was then blended in an amount of 40 percent by weight with 60 percent by weight of a styrene, ethyl acrylate, acrylamide interpolymer prepared according to the method of Example III. A second sample of the alkyd resin was blended in an amount of about 70 percent by weight with 30 percent by weight of the same acrylamide interpolymer. Each of the two compositions was then pigmented with titanium dioxide in an amount of 0.9 part of pigment per part of resin solids. The resulting composition was ground on a Kent 3-roll mill and films prepared therefrom. Certain of the films were baked for 30 minutes at 300° F., others for 30 minutes at 325° F., and a third group for 30 minutes at 350° F. The impact resistance and gloss of each film are shown in the accompanying table:

| Percentage Composition | | 30 Minutes at 300° F. | | 30 Minutes at 325° F. | | 30 Minutes at 350° F. | |
|---|---|---|---|---|---|---|---|
| Acrylamide Interpolymer | Alkyd Resin | Impact Resistance | Gloss | Impact Resistance | Gloss | Impact Resistance | Gloss |
| 60 | 40 | 12 | Good | 12 | Good | 12 | Good. |
| 30 | 70 | 12 | do | 12 | do | 12 | Do. |

Example XII

An alkyd resin was prepared from the following components:

| Components: | Parts by weight |
|---|---|
| Refined tall oil fatty acids | 7.7 |
| Coconut oil acids | 30.9 |
| Synthetic glycerin | 28.1 |
| Phthalic anhydride | 41.25 |

The resulting alkyd resin had a solids content of 58 percent in xylol, and a weight per gallon of 8.45 pounds.

Five and one-half parts of this alkyd resin was admixed with 15.5 parts of the aldehyde modified acrylamide interpolymer of Example IX, 30.6 parts of xylol, 18.4 parts of rutile titanium dioxide, and 0.74 part of phthalocyanine blue pigment. The mixture was placed in a pebble mill and milled for about 15 hours, at which point the mixture had a Hegman grind of 7. Eleven parts of the above alkyd and 31 additional parts of the interpolymer of Example IX were then added to the pebble mill and the resulting mixture milled for two hours, after which the mill was washed with 16.2 parts of xylol. The resulting mixture in the mill was then let down with 392 parts of the interpolymer of Example IX, 136 parts of the alkyd resin of this example, 105 parts of xylol and 0.6 part of a 1 percent solution of a silicone oil used as an antiflooding agent.

The pastel blue coating composition thus obtained was drawn onto bonderized metal panels to a thickness of about 1.2 to 1.5 mils and the films baked for 30 minutes at 350° F. These films exhibited excellent gloss, hardness, impact resistance, and resistance to stains, salt spray, detergents, and food products.

Example XIII

To illustrate the superior properties of films obtained utilizing the coating compositions of this invention the following compositions were prepared:

Composition A:
  90 percent interpolymer of Example IX
  10 percent alkyd resin of Example XII Composition B:
  85 percent interpolymer of Example IX
  15 percent alkyd resin of Example XII Composition C:
  75 percent interpolymer of Example IX
  25 percent alkyd resin of Example XII Composition D:
  60 percent interpolymer of Example IX
  40 percent alkyd resin of Example XII Composition E:
  90 percent interpolymer of Example IX
  10 percent epoxy resin (Epon 1001)

Composition F:
  60 percent coconut oil alkyd (35 percent oil length)
  40 percent 1:1 mixture of urea-formaldehyde-melamine-formaldehyde Composition G:
  60 percent castor oil alkyd resin
  40 percent 1:1 mixture of urea-formaldehyde-melamine-formaldehyde Bonderite panels were prepared utilizing each of the above formulations as film forming materials. Panels coated with Compositions A to E inclusive were baked for 30 minutes at 350° F., and panels coated with Compositions F and G were baked for 30 minutes at 300° F. The properties of the resulting films are set forth in the table below:

| Panel | Film composition | Baked film properties | | | |
|---|---|---|---|---|---|
| | | 60° Gloss | Sward Rocker Hardness | Pencil Hardness | Impact, Inch Pounds |
| 1 | A | 80 | 44 | 5H | 12 |
| 2 | B | 83 | 46 | 5H | 12 |
| 3 | C | 80 | 44 | 5H | 12 |
| 4 | D | 85 | 34 | H | 18 |
| 5 | E | 90 | 42 | 5H | 18 |
| 6 | F | 85 | 36 | H | <6 |
| 7 | G | 81 | 18 | HB | 18 |

Example XIV

This example illustrates that useful compositions can also be obtained by utilizing a minor amount of a melamine-formaldehyde condensation product in conjunction with the acrylamide interpolymer and the alkyd resin. Ordinarily, the melamine tends to be incompatible when utilized in an amount more than about 15 percent by weight, so that preferably the quantity of melamine resin which is utilized is about 10 percent.

To illustrate the use of a melamine resin, a resinous blend was prepared from 50 percent by weight of the acrylamide interpolymer, 40 percent by weight of the alkyd resin, and 10 percent by weight of a melamine-formaldehyde resin. The mixture was pigmented with titanium dioxide in accordance with the method of Example XI, and films from the resulting composition were baked according to the schedule of Example XI. In each instance the resulting film had an impact resistance greater than 12 and good gloss.

In addition to urea-formaldehyde resins, minor quantities of other resinous products, such as melamine-formaldehyde resins, vinyl resins, epoxy resins, and the like may be blended with acrylamide interpolymers and alkyd resins to give useful variations in properties. Other modifications in the compositions may also be made; for example, pigments other than titanium dioxide may be utilized as may different solvents.

While specific examples of the invention have been set forth hereinabove, it is not intended that the invention be limited solely thereto, but to include all of the variations and modifications falling within the scope of the appended claims.

We claim:

1. A heat hardenable resinous composition comprising an alkyd resin, and an interpolymer of an acrylamide with at least one other monomer having a $CH_2=C<$ group, said interpolymer being characterized by having amido hydrogen atoms replaced by the structure $$-ROR_1$$

wherein R is a saturated lower aliphatic hydrocarbon radical having its free valences on a single carbon atom, and $R_1$ is a member of the class consisting of hydrogen and lower alkyl radicals.

2. A heat hardenable resinous composition comprising from about 5 percent to 75 percent by weight of an alkyd resin, and from about 25 percent to 95 percent by weight of an interpolymer of an acrylamide with at least one other monomer containing a $CH_2=C<$ group, said interpolymer being characterized by having amido hydrogen atoms replaced by the structure $$-ROR_1$$

wherein R is a saturated lower aliphatic hydrocarbon radical having its free valences on a single carbon atom, and $R_1$ is a member of the class consisting of hydrogen and lower alkyl radicals.

3. The heat hardenable resinous composition of claim 2 wherein the alkyd resin employed is an oil modified alkyd resin.

4. The heat hardenable resinous composition of claim 3 wherein the interpolymer is an interpolymer of acrylamide, ethyl acrylate and styrene.

5. The heat hardenable resinous composition of claim 3 wherein the interpolymer is an interpolymer of acrylamide and vinyl toluene.

6. The heat hardenable resinous composition of claim 3 wherein the interpolymer contains an unsaturated dicarboxylic acid as one component.

7. The heat hardenable resinous composition of claim 3 wherein the alkyd resin is prepared from glycerol, phthalic anhydride, and a member of the class consisting of cottonseed acids and coconut oil acids.

8. A heat hardenable resinous composition comprising about 5 percent to 75 percent by weight of an alkyd resin, and from about 25 percent to 95 percent by weight of an interpolymer of acrylamide with at least one other monomer containing an aliphatic $CH_2\!=\!CH\!<$ group, which interpolymer has been reacted with a monoaldehyde containing only atoms of carbon, hydrogen, and oxygen, said aldehyde having been employed in an amount of from 0.2 equivalent to 5.0 equivalents for each amide group of said acrylamide interpolymer.

9. The heat hardenable resinous composition of claim 8 wherein the alkyd resin is an oil modified alkyd resin.

10. The heat hardenable resinous composition of claim 9 wherein the alkyd resin is prepared from glycerol, phthalic anhydride and a member of the class consisting of cottonseed acids and coconut oil acids.

11. The heat hardenable resinous composition of claim 9 wherein the interpolymer is an interpolymer of acrylamide, ethyl acrylate and styrene.

12. The heat hardenable resinous composition of claim 9 wherein the interpolymer is an interpolymer of acrylamide and vinyl toluene.

13. The heat hardenable resinous composition of claim 9 wherein the interpolymer contains an unsaturated monocarboxylic acid as one component.

References Cited in the file of this patent

UNITED STATES PATENTS

| | | |
|---|---|---|
| 2,173,005 | Strain | Sept. 12, 1939 |
| 2,205,355 | Grimm et al. | June 18, 1940 |
| 2,344,793 | Tissari | Mar. 21, 1944 |
| 2,443,735 | Kropa | June 22, 1948 |
| 2,590,654 | Schmutzler | Mar. 25, 1952 |
| 2,748,092 | Daniel et al. | May 29, 1956 |
| 2,776,267 | Weber et al. | Jan. 1, 1957 |
| 2,808,383 | Fikentscher et al. | Oct. 1, 1957 |

UNITED STATES PATENT OFFICE
CERTIFICATION OF CORRECTION

Patent No. 2,940,945                                          June 14, 1960

Roger M. Christenson et al.

It is hereby certified that error appears in the above numbered patent requiring correction and that the said Letters Patent should read as corrected below.

Column 2, lines 3 to 7, the structure should appear as shown below instead of as in the patent:

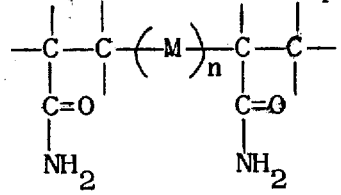

same column 2, lines 22 to 27, the structure should appear as shown below instead of as in the patent:

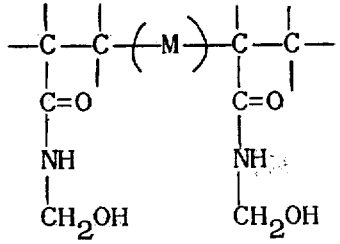

column 5, line 13, after "high" insert -- as --; lines 70 to 75, the structure should appear as shown below instead of as in the patent:

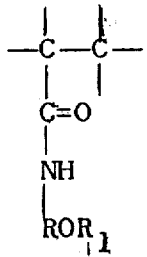

column 13, line 17, for "an aliphatic" read -- a --; line 18, for "a" read -- an aliphatic --.

Signed and sealed this 6th day of June 1961

Attest:

ERNEST W. SWIDER  
Attesting Officer

DAVID L. LADD  
Commissioner of Patents